H. BRACKETT.
Harvester Dropper.
No. 89,732.  Patented May 4, 1869.
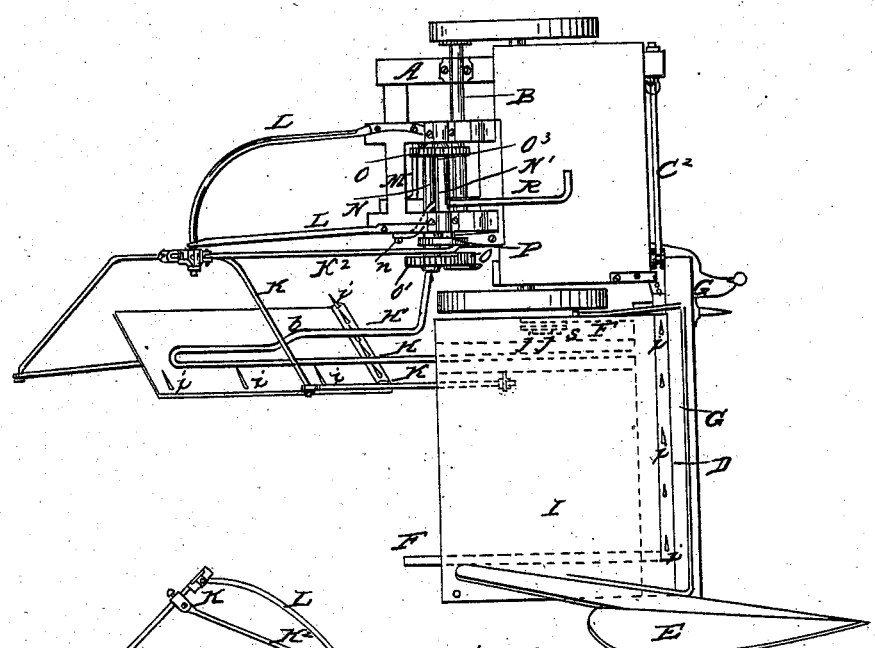
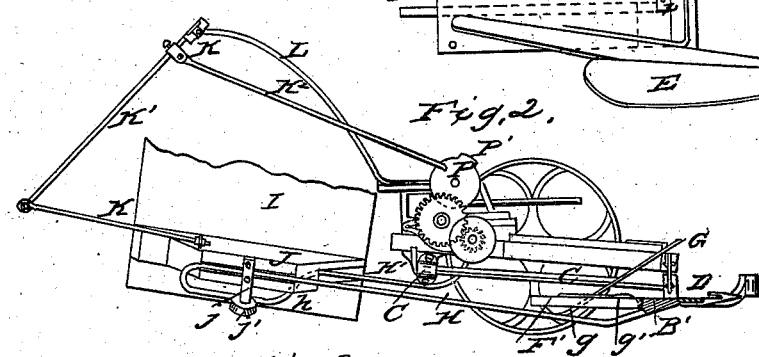
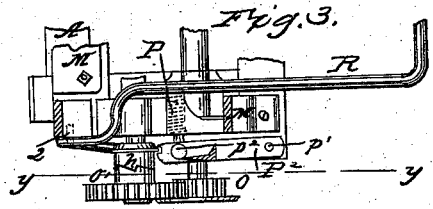
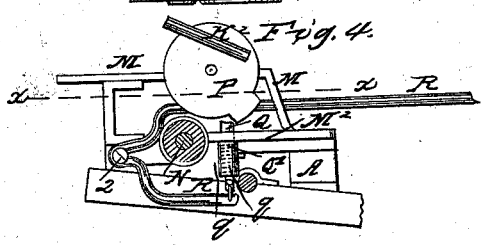

UNITED STATES PATENT OFFICE.

HENRY BRACKETT, OF VALLEY FALLS, NEW YORK.

IMPROVEMENT IN HARVESTER-DROPPERS.

Specification forming part of Letters Patent No. 89,732, dated May 4, 1869.

*To all whom it may concern:*

Be it known that I, HENRY BRACKETT, of Valley Falls, county of Rensselaer, State of New York, have invented certain new and useful Improvements in Droppers for Harvesters, of which the following is a full, clear, and exact description, reference being had to the accompanying drawing, making a part of this specification, in which—

Figure 1 is a plan or top view of a harvesting-machine embracing my improvements. Fig. 2 is a side elevation of the same, partly in section. Fig. 3 is a horizontal section of the driving-gear and shipping mechanism, taken in line $x\,x$, Fig. 4; and Fig. 4 is a vertical longitudinal section of the same in line $y\,y$, Fig. 3.

Similar letters of reference denote corresponding parts wherever used.

My invention has for its object the construction and arrangement of a "dropper," or a dumping-platform for a harvesting-machine, which is adapted, by its own movements, to deposit the cut grain in compact gavels upon the ground, out of the way of the team and machine on the succeeding round; and also the arrangement of such dropper, and of the devices for operating the same, in such manner that while the platform is automatically operated it is at the same time placed under the control of the attendant, so that it may be made to discharge the grain more or less frequently, at the option of the attendant, and as the character or condition of the crop may require, as hereinafter described.

In the accompanying drawing, A represents a main frame, of any desired construction, mounted on two independent driving-wheels, which communicate motion to the pinion or counter-shaft B, and thence to the cutters in any usual manner. C is the main shoe, hinged or pivoted at its rear end in a swiveling box, supported by a bracket or pendant, $C^1$, attached to the frame A, and at its forward end said shoe is connected by a hinged brace or coupling, $C^2$, with the front outer corner of frame A in such manner as to permit the free movement independently of the frame of the forward end of the shoe C, to which the finger-bar D is attached.

The outer end of the cutting apparatus is supported at the required height by an adjustable grain-wheel attached to the outer shoe or to the divider E. D' is a platform-bar, arranged behind the finger-bar D, lying parallel therewith, and rigidly connected to said finger-bar, or to the finger-bar and shoe, in any suitable manner. The bar D' is provided with arms or supports F F', arranged at right angles thereto, the outer one of which, F, forms a support to the outer end of the dropping-platform during the reciprocating movements of the said platform, and also when the latter is in position to receive the falling grain.

The inner bar, F', forms a support for the inner end of an angular bail-rod or cut-off, G, the outer end of which has a pivotal support at $f$ upon the divider or grain-guard E. H is a guide and supporting rod, attached at one end to the finger and platform bars D D', and extending rearward sufficiently far to accommodate the reciprocating movement of the platform, the inner end of which is supported thereby, where said rod is bent or turned back, in form represented in Figs. 1 and 2, and has its other end or arm, H', connected to the hinged main shoe C, or an equivalent support, where the hinged finger-bar is employed.

I is the platform, supported at its outer end on bar F, and provided at its inner end with a grooved block, J, which embraces and travels upon the rod H. An arm, $j$, secured to the lower face of block J, serves to hold said block in place on the rod H, and is provided on its inner end with a grooved pulley or roller, $j'$, which works underneath the arm or rod H', for giving the necessary tilting or dumping movement to the platform, and also under the curved heel-extension $g$ of the pivoted bail-rod or cut-off G, for operating the same, as hereinafter explained.

The platform I, which may be of any suitable material and construction, either solid or composed of slats, is connected by a pitman, K, to the swinging end of a vibrating arm or lever, $K^1$, the opposite or upper end of which is connected by a swiveling head to a pivotal support at $k$ upon a standard, L, which, at its foot, is bolted to a removable gear-frame, M, mounted on the main frame A.

Frame M is provided with bearings for a lower shaft, N, provided with spur-gears $O^1$ $O^2$, the former of which, $O^1$, receives motion from a spur-gear, O, on the main or counter shaft of the machine. The gear $O^1$, through a saw-tooth or backing-clutch at $n$, drives the shaft N, spur-wheel $O^2$, and the latter engages with a spur-gear, $O^3$, on shaft N′, also mounted in bearing in frame M.

The shaft N′ is provided at its inner end with a crank-wheel, P, from which, through a pitman, $K^2$, motion is imparted to the vibrating arm $K^1$, and thence through pitman K, above described, to the reciprocating platform I.

The clutch $n$ is held engaged with the driving spur-gear $O^1$ by means of a spring, $p$, (shown in dotted lines, Fig. 3,) the tension of which is applied to a forked shipping arm or lever, $P^2$, for that purpose. The shipping arm or lever $P^2$ is pivoted at $p^1$, and is perforated at $p^2$ to receive a spring pin or bolt, Q, mounted in a socket, Q′, in frame M.

A spring, $q$, in socket Q′, and surrounding bolt Q, serves to hold the pin up at the required height to be acted upon by a projecting cam, $P^1$, on the crank-wheel P, (shown in Fig. 5 and in red lines, Fig. 4,) whereby the shipping-arm P is moved outward against the resistance of spring $p$ and the clutch $n$ is disengaged from the driving spur-gear $O^1$, thereby allowing the mechanism for operating the platform to remain at rest.

The lower end of the spring-bolt Q is linked to the arm R′ of a bent lever, R, which is pivoted to the gear-frame at $r$, and extends forward into convenient position to be operated by the hand or foot of the driver in his seat on the machine.

By this arrangement, whenever a sufficient quantity of grain has accumulated to form a gavel, the attendant, by pressing down on lever R, withdraws the spring-bolt Q from the action of the retracting-cam $P^1$, when the clutch $n$ is thrown outward by the action of spring $p$ and engages the wheel $O^1$ with the shaft N, for operating the platform through the gearing and connections described.

The cam $P^1$ is so arranged on the crank-wheel P that when the spring-bolt Q is withdrawn the crank is in position to begin its backward throw, and, acting through pitman $K^2$, moves the vibrating arm $K^1$ backward, and with it the pitman and platform I, until the roller $j'$, attached to the platform as described, passes the incline $h$ in the rod or arm H′, thereby tilting the platform sidewise, and discharging the grain thereon upon the ground behind the machine. As the crank moves onward and begins its forward throw the movement of the platform is reversed, and the latter is again returned to proper position to receive the falling grain, and its operating mechanism is thrown out of gear until another gavel has accumulated, when the operation is repeated.

As the platform moves forward to a position to receive the grain the roller $j'$ escapes from rod or arm H′ and passes underneath the curved heel-extension $g$ of the cut-off G, and depresses the latter or moves it out of the way, allowing the grain accumulated thereon to fall upon the platform.

A spring, $g'$, attached to the platform-bar or to arm F′, serves to throw the cut-off up into proper position to receive the grain when the platform and roller $j'$, attached thereto, are withdrawn. The spring $g'$ may, however, be dispensed with and the cut-off operated in both directions by the movements of the platform.

The platform is provided on its forward edge with a number of teeth, $i$, set inclining inward, which serve to hold the grain on the platform in its backward movement, and at the same time allow the grain to slide readily over them when the platform is tilted.

Similar teeth, $i'$, on the outer end of the platform pass underneath the divider or guard E when the platform moves forward to receive the grain, and serve to prevent the grain from being shaken off at the outer end of the platform when the latter is moved back.

The grooved block J may be provided with grooved friction-rollers for traversing the rod H, or the block may be dispensed with and grooved rollers used in its place, and various other modifications may be made in the details of construction, and also in the means for operating the platform and cut-off.

I have shown and described my improvements as adapted to a front-cut two-wheel hinged-bar machine; but it will be obvious that they may be applied to any of the various constructions of machines in use, whether front or rear cut, with one or two wheels, and where the bar is rigid.

Where the machine has a rear cut a movement of the platform merely sufficient to enable the latter to clear the reel and to operate the cut-off is all that is required; but in the front-cut machine represented provision is made for such a throw of the platform as will cause the discharge of the grain behind the main frame. If preferred, however, space may be left between the inner end of the platform and the machine for the discharge of the grain without greater movement of the platform than would be required in a rear-cut machine.

The pitman $K^2$ may be adjusted on vibrating arm $K^1$ for varying the throw of said arm to suit the extent of movement required of the platform.

What is claimed, and sought to be secured by Letters Patent, is—

1. A dumping or tilting platform adapted to reciprocate in a path parallel or thereabout with the path of the machine and to discharge the grain behind the machine, out of the way of the team and machine on the succeeding round.

2. The inclined track or way $h$, in combination with arm $j$ on the platform, or the equivalent thereof, for automatically tilting the platform in its backward movement.

3. A guide-rod and pivotal support, H, and inclined track $h$, in combination with the reciprocating and dumping platform, for the purpose set forth.

4. The combination of a platform reciprocating in a path parallel with the path of the machine and a cut-off operated by said platform.

5. The combination of a reciprocating platform and spring with the cut-off for operating the same, substantially as described.

6. The combination of crank-wheel P, connecting-rods K K$^2$, vibrating arm K$^1$, and rod H, or equivalent devices, for giving to the platform a reciprocating and dumping movement, substantially as described.

7. The cam on the crank-wheel, in combination with the spring-bolt and shipping arm or lever, or their equivalent, for throwing the mechanism which operates the platform out of gear, as set forth.

8. The combination of lever R with the spring-bolt Q, for releasing the same from the retracting-cam, as set forth.

HENRY BRACKETT.

Witnesses:
 E. F. FROST,
 DAN. KEAMER.